No. 669,727. Patented Mar. 12, 1901.
C. D. FULLER.
MEANS FOR REMOVING HULLS FROM BEANS.
(Application filed Feb. 17, 1899. Renewed Jan. 16, 1901.)
(No Model.)
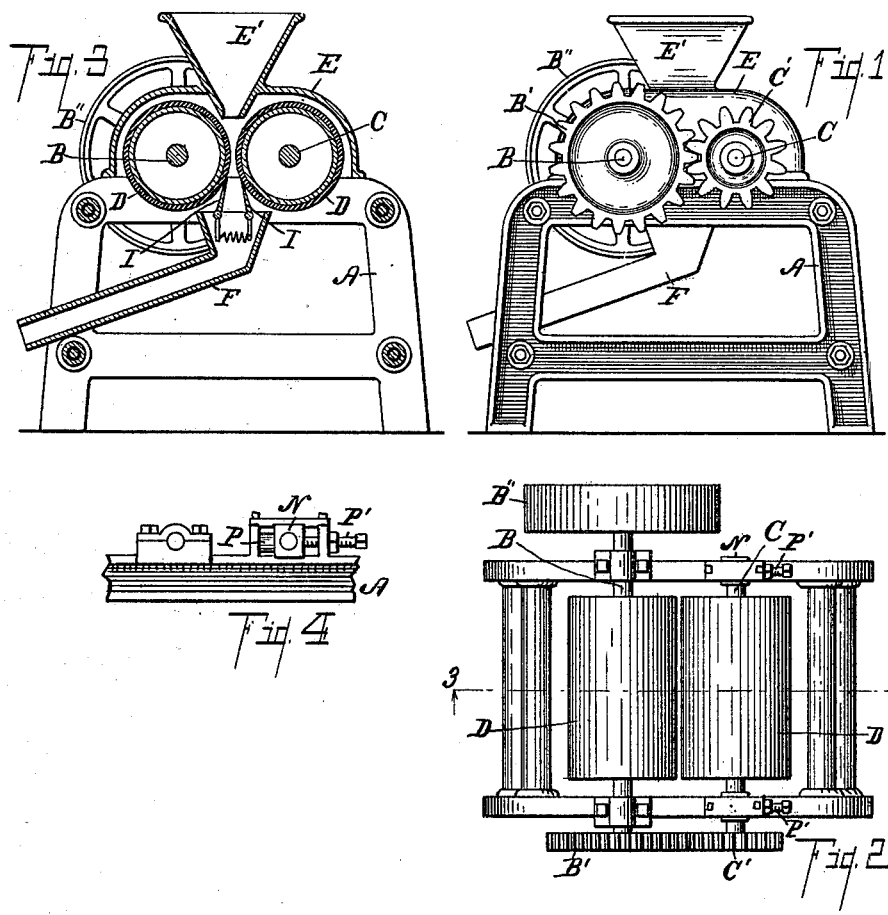
Witnesses:
Inventor,

UNITED STATES PATENT OFFICE.

CHARLES D. FULLER, OF KALAMAZOO, MICHIGAN.

MEANS FOR REMOVING HULLS FROM BEANS.

SPECIFICATION forming part of Letters Patent No. 669,727, dated March 12, 1901.

Application filed February 17, 1899. Renewed January 16, 1901. Serial No. 43,520. (No model.)

*To all whom it may concern:*

Be it known that I, CHARLES D. FULLER, a citizen of the United States, residing at the city of Kalamazoo, in the county of Kalamazoo and State of Michigan, have invented certain new and useful Improvements in Means for Removing Hulls from Beans, of which the following is a specification.

This invention relates to improvements in means for removing hulls from beans or for removing the outer skins from various kernels, such as the outer skins from almonds and the like, though it is specially intended for use in removing the hulls from beans.

The invention relates, further, to the method of removing the hulls from beans.

It is well known that when beans, almonds, and the like seeds are thoroughly soaked the outer skin wrinkles and becomes loosened from the kernels within, and the outer skins have been removed by soaking in this way and then pinching off the skins with the fingers. So far as I am able to find heretofore no one has attempted to remove the hulls from beans by soaking and then rubbing them between proper surfaces.

One object of this invention is to provide a means of quickly breaking and removing the hulls from beans and other seeds after they have been soaked and to provide an improved means for treating beans to eliminate their outer hulls.

Further minor objects will fully and clearly appear in the detailed description to follow.

I accomplish these objects of my invention by the devices and means illustrated in the accompanying drawings, in which—

Figure 1 is a side elevation of a machine embodying the features of my invention. Fig. 2 is a plan view of the same. Fig. 3 is a longitudinal sectional view taken on line 3 3 of Fig. 2. Fig. 4 is an enlarged detail view showing one of the adjustable bearing-boxes for one of the rollers.

In the drawings similar letters of reference refer to similar parts throughout the several views and all of the sectional views are taken looking in the direction of the little arrows at the ends of the section-lines.

Referring to the lettered parts of the drawings, A is the main supporting-frame for the machine, made up of oppositely-arranged parallel plates suitably connected together, one plate for each side. On the top of the frame are supported rollers D D', preferably of the same size, the rollers being preferably covered with a layer of rubber, leather, or similar material. Rolls of solid rubber or other material might be used. The roller D' is supported on a shaft C, which has a small cog-wheel C' meshing with the cog-wheel B'. There is also a driving-pulley B'' on the shaft B, from which the machine is driven. A suitable casing E is over the tops of the rollers and has a hopper E', delivering down between the rollers. Suitable scrapers I I are provided, which are held by spring-pressure against the rollers to scrape the beans or other grains or seed from them as it passes through. A broad spout F is below to collect and discharge the beans. The roller D' is adjustable to and from the roller D by means of the adjustable bearings N, which are fitted in suitable ways and are adjusted by set-screws P', acting against the springs P, which may be of rubber or of steel or any suitable material.

When it is desired to remove the hulls from the beans, they are first soaked until the hulls are thoroughly wrinkled over the same. The roller D' is then adjusted into close proximity with the roller D and the beans are poured into the hopper E'. Owing to the gearing, one roller runs faster than the other, and as a consequence beans—or any other seeds, for that matter—coming between the same will be speedily rubbed, which, when the beans are thoroughly soaked, will cause the skins to break and the kernels to be discharged therefrom. As the rollers tend to carry the beans forward in the same general direction, they will be discharged into the spout F with the skins separated from the kernels. They can then be dried, run through a fanning-mill, or they can be discharged into a tank of water, and owing to the differences of specific gravity the kernels will separate.

I am aware that various means might be provided for actuating the various parts of my machine, and I therefore do not attempt to illustrate or describe them all; also, that the devices can be further varied throughout their different details without departing from my invention.

Having thus described my invention, what

I claim as new, and desire to secure by Letters Patent, is—

1. In a machine of the class described the combination of a supporting-frame; rollers adjustable to and from each other; cushions as of rubber on said rollers; means of actuating the said rollers at different rates of speed toward each other; scrapers to remove any accumulations therefrom and a hopper or spout to feed beans or other articles to be passed between the same, as specified.

2. In a machine of the class described the combination of a supporting-frame; rollers adjustable to and from each other; cushions as of rubber for the surface of said rollers; means of actuating the said rollers at different rates of speed toward each other; and a hopper or spout to feed beans or other articles to be held between the same, as specified.

In witness whereof I have hereunto set my hand and seal in the presence of two witnesses.

CHARLES D. FULLER. [L. S.]

Witnesses:
 CASSA M. CHAPPELL,
 OTIS A. EARL.